G. S. ENGLE.
PRIMARY BATTERY.
APPLICATION FILED APR. 10, 1909.
1,049,347.
Patented Jan. 7, 1913.
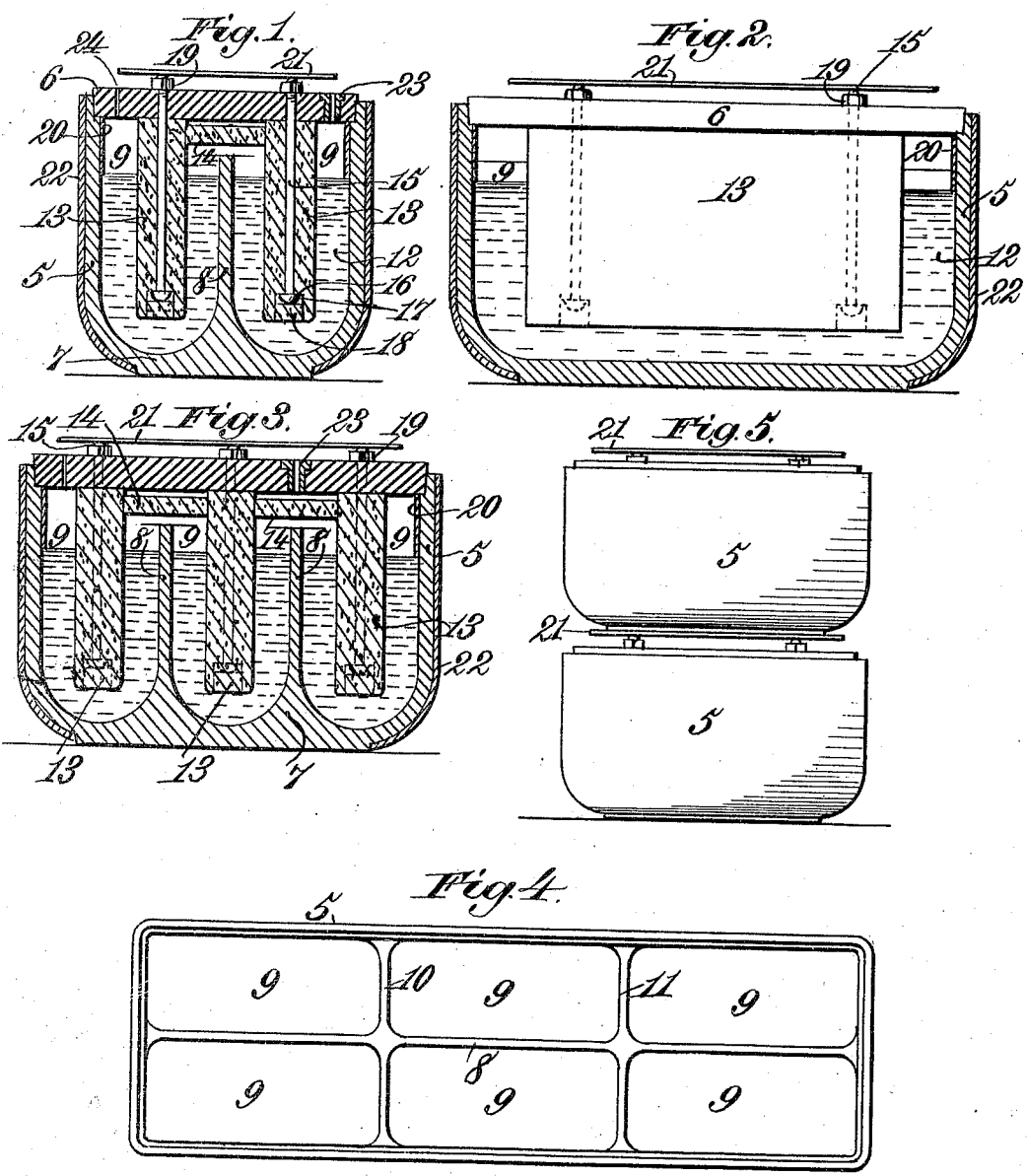
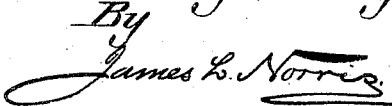

UNITED STATES PATENT OFFICE.

GEORGE S. ENGLE, OF PROVIDENCE, RHODE ISLAND.

PRIMARY BATTERY.

1,049,347.   Specification of Letters Patent.   Patented Jan. 7, 1913.

Application filed April 10, 1909. Serial No. 489,141.

*To all whom it may concern:*

Be it known that I, GEORGE S. ENGLE, a citizen of the United States, residing at Edgewood, Providence, in the county of Providence and State of Rhode Island, have invented new and useful Improvements in Primary Batteries, of which the following is a specification.

This invention relates to primary batteries of that type wherein the wall of the containing vessel or receptacle is formed from an electrical generating material or composition which is chemically attacked by the electrolyte which in the present instance is preferably of an alkaline nature.

The material used in forming the vessel or receptacle in accordance with this invention consists of a suitable composition carrying zinc which is exposed to the action of the alkaline electrolyte so as to produce an alkaline zincate which is soluble and lessen the internal resistance by forming a more perfect conducting fluid.

The primary object of the present invention is to materially increase the amperage within minimized proportions of the battery cell organization and thus render a primary battery of this character of greater commercial value particularly as a motive generating means.

The invention consists in the construction and arrangement of parts which will be more fully hereinafter explained in various preferred forms, but it will be understood that the invention is not limited to any precise details of construction, the essential feature being to utilize two or more distinct compartments which are preferably formed by partition means of an imperforate character rigidly connected to or forming an integral part of the main vessel or receptacle and having an alkaline electrolyte therein and battery elements which are connected up at least exteriorly of the complete cell by a conducting means.

In the drawings, Figure 1 is a transverse vertical section through a cell having two compartments and embodying the features of the invention. Fig. 2 is a longitudinal vertical section of the cell as shown by Fig. 1. Fig. 3 is a view similar to Fig. 1 showing a cell with three compartments. Fig. 4 is a top plan view of a cell showing a plurality of compartments greater in number than shown by Fig. 3. Fig. 5 is a side elevation of two cells illustrating the manner of assembling all the cells for practical service.

The numeral 5 designates a casing or receptacle carrying zinc in the body thereof which is exposed at the inner portion to the action of the electrolyte hereinafter specified, the said receptacle having minimized dimensions though capable of enlargement to adapt it for different applications. In the upper open top portion of the casing or receptacle 5 a cover 6 of suitable insulating material is fitted and projects at its perimeter far enough above the upper edge of the receptacle to prevent contact with the latter by superimposed receptacles of a similar character and to effectively carry out its insulating functions. The receptacle 5 has a completely closed bottom 7 and in the form shown by Figs. 1 and 2 a single partition 8 of the same composition or material as the body of the receptacle extends centrally through the latter to form two compartments 9, the said partition 8 being fixed to or preferably integrally formed with the receptacle and of less vertical extent than the side and end walls of said receptacle to provide for the introduction of battery elements beneath the cover 6, as will be presently explained.

In the form of the device shown by Fig. 3 a third compartment 9 is provided, there being two partitions 8 used in this instance.

In the form of the cell shown by Fig. 4 a greater number of compartments 9 is illustrated and produced by intersecting partitions 10 and 11. Within the compartments, whatever their number may be, a suitable alkaline electrolyte 12 is disposed to coact with negative elements or poles of the cell.

The receptacle 5 and the several partitions hereinbefore explained constitute the positive element or pole of the cell and the negative element or pole consists of carbon or carbonaceous fingers, plates or members 13 individually projecting into the compartments and connected or bridged by members 14 of similar material and located, when the negative element as a whole is applied, above and out of contact with the upper edges of the partitions or each partition, and extending upwardly through the carbon or carbonaceous element are bolts 15 which have their heads 16 countersunk in the lower portions of the carbon elements as at 17 and covered by a suitable insulating medium 18. These bolts serve as conductors and project through the cover 6 where they are fastened by suitable nuts or other devices 19, the carbon elements being drawn up tightly against the under surface of the cover by these bolts. The connecting or bridging members in all the forms shown act to gather up the current from the several pendant carbon elements and render the generating action uniform in relation to the complete cell.

The connecting or bridging members for the carbon elements are fixed to the latter in any suitable manner and will be preferably located as shown, though it is obvious that they may be raised or lowered in accordance with the proportions and dimensions of the cell. The electrolyte does not overflow the upper terminal edges of the compartments or partitions forming the compartments, the electrolyte always remaining in a cold state in contradistinction to thermo-cells where different degrees of heat are used to accelerate or increase the amperage.

The top portion of the inner surface of the receptacle 5 is provided with means in the form of a covering 20 to prevent the electrolyte from creeping up to the joint between the cover 6 and the upper portion or rim of the receptacle 5 and carrying the alkaline zincate through the joint and which zincate would immediately be resolved into powder form by exposure to the atmosphere with serious detriment to the cleanliness of the cell. This rim covering 20 also obstructs the loss of the alkaline zincate from the electrolyte and is highly beneficial in view of the fact that a certain percentage of the alkaline zincate must be maintained in solution in the electrolyte. The covering 20 in the present instance is composed of Portland cement, sand and cotton fiber, two parts of the cement and one of sand being used and enough cotton fiber employed to form a practical binder. This covering is applied while the composition is in a plastic state and has such depth and thickness as to render it practical in preventing creeping of the alkaline zincate through the joint between the cover and the receptacle, as hereinbefore explained.

In assembling the battery cells for practical service a copper plate 21 is placed over and in contact with the bolt extremities projecting through the insulating cover 6, and on this copper plate the bottom portion of another cell is disposed so as to be in direct contact with the said plate, this assemblage of the cells being carried out with relation to all the cells used in a complete battery of a given number of cells. The outer surface of the receptacle 5 is covered with a suitable insulating composition or material as at 22 to conserve the energy of each cell. The bottoms of the cells, however, are left without this insulating covering so as to establish a reliable contact with the copper conducting plate 21 placed between each pair of cells. By introducing copper conducting plates between the cells as explained a connection of the cells in series is obtained, and any suitable means may be employed for connecting the cells in parallel.

As explained in my copending application Serial Number 465,938, the alkaline electrolyte acts on the wall and partition or partitions of the cell and chemically coöperates with the zinc and also the carbon element or elements and the zinc combines with the alkali to form an alkaline zincate which is maintained in solution and prevented from depositing on the negative or carbon element to any material extent with the advantage that a more perfect conducting fluid is formed and the internal resistance of the cell is reduced to a minimum and the local action on the zinc of the receptacle is also very materially reduced.

It will be understood that the electrolyte may be introduced into receptacle 5 through a filling tube or nipple 23 in the cover 6, and after the electrolyte has been thus supplied to the cell the tube or nipple 23 is closed by inserting therein a suitable plug or cork. No air from the exterior of the cell is permitted to enter the latter and under excessive pressure a portion of the gas may escape through the joint between the said filling tube or nipple and the casing or cover. Otherwise the cell is tightly closed and sealed, except a small pin-hole 24 for hydrogen to escape.

It is proposed in some instances to introduce in the electrolyte certain quantities of alkaline zincate prior to filling or supplying the receptacle 5 with the electrolyte in order to prevent a forceful attack on the zinc of the receptacle by the electrolyte in the first instance. This preliminary step will not in the least affect the chemical action of the electrolyte, but on the contrary has the advantage of materially lessening the internal resistance. The presence of alkaline zincate in the electrolyte has the effect of prolonging the life or activity of the battery from a standpoint of generation, and practice has demonstrated that the presence of alkaline zincate in the electrolyte is one of the most essential features of the invention.

What is claimed is:

1. A battery cell consisting of a receptacle having partition means integral therewith to form compartments therein, the partition means being of less vertical height than the receptacle and the compartments having inner bottom surfaces of concave form, the body of the receptacle and partition means carrying zinc and unitedly constituting one pole, a carbon pole comprising a plurality of separated members suspended in the compartments and having horizontal connecting means located above the upper edge of the partition, the connecting means being out of contact with the upper edge of the partition and also composed of carbon, an insulating cover to which the said carbon pole members are attached, and a cold alkaline electrolyte within the compartments and held in separated quantities by the partitions.

2. A battery cell consisting of a receptacle having partition means integrally formed therewith to form compartments therein, the partition means being of less vertical height than the receptacle, the body of the receptacle and the partition means carrying zinc and unitedly constituting one pole, the bottoms of the compartments having a concave contour and gradually merging into the sides and ends of the receptacle and the partitions, a carbon pole comprising a plurality of members suspended in the compartments and having horizontal connecting means of carbon located above the upper edges of the partitions and out of contact with said latter edges, an insulating cover to which the said carbon members are attached, an outer insulating material enveloping the opposite extremities and sides of the body of the receptacle and leaving the bottom fully exposed for conducting contact with a similar battery cell, and a cold alkaline electrolyte within the compartments and held in separated quantities by the said compartments, the cover also carrying means for making an electrical connection with the cell.

In testimony whereof I have hereunto set my hand in presence of two subscribing witnesses.

GEORGE S. ENGLE.

Witnesses:
 CHAS. S. HYER,
 JAMES L. NORRIS, Jr.

---

Copies of this patent may be obtained for five cents each, by addressing the "Commissioner of Patents, Washington, D. C."